US007133692B2

(12) United States Patent
Rosebrock

(10) Patent No.: US 7,133,692 B2
(45) Date of Patent: Nov. 7, 2006

(54) INTERFACE MODULE IN A VEHICLE
(75) Inventor: Ralf Rosebrock, Laatzen (DE)
(73) Assignee: Robert Bosch GmbH, Stuttgart (DE)
( * ) Notice: Subject to any disclaimer, the term of this patent is extended or adjusted under 35 U.S.C. 154(b) by 0 days.
(21) Appl. No.: 10/467,023
(22) PCT Filed: Sep. 12, 2002
(86) PCT No.: PCT/DE02/03389
§ 371 (c)(1),
(2), (4) Date: Jan. 12, 2004
(87) PCT Pub. No.: WO03/049325
PCT Pub. Date: Jun. 12, 2003
(65) Prior Publication Data
US 2004/0102216 A1 May 27, 2004
(30) Foreign Application Priority Data
Nov. 30, 2001 (DE) .............. 101 58 988
(51) Int. Cl.
H04M 1/00 (2006.01)
(52) U.S. Cl. .............. 455/556.1; 455/569.2; 455/575.9
(58) Field of Classification Search ......... 455/556.1, 455/569.2, 575, 575.9; 340/539, 425.5, 527, 340/456.1, 521, 78
See application file for complete search history.
(56) References Cited

U.S. PATENT DOCUMENTS 4,390,750 A     6/1983  Bartelink
5,029,234 A  *  7/1991  Kawai et al. ............... 455/527
5,923,731 A     7/1999  McClure
6,426,693 B1 *  7/2002  Inomata ................. 340/539.21
6,532,152 B1 *  3/2003  White et al. ................ 361/692
6,542,077 B1 *  4/2003  Joao ....................... 340/426.16
6,748,318 B1 *  6/2004  Jones ......................... 701/201
2003/0040944 A1 *  2/2003  Hileman ......................... 705/5

FOREIGN PATENT DOCUMENTS

EP      1 058 220     12/2000
WO      00 608 42     10/2000

* cited by examiner

Primary Examiner—Cong Van Tran
(74) Attorney, Agent, or Firm—Kenyon & Kenyon

(57) ABSTRACT

An interface module in a vehicle that provides for the vehicle a connection to a communication network, for example the Internet, and executes the function of a watchdog for the components in the vehicle connected to it. For this purpose, a processor of the interface module performs a function test of the connected components at specified time intervals and sends a function signal as a function of this function test. If at least one component is not functioning properly, the processor restarts the component concerned. This is achieved for example by switching a circuit breaker.

7 Claims, 2 Drawing Sheets

INTERFACE MODULE IN A VEHICLE

FIELD OF THE INVENTION

The present invention is directed to an interface module in a vehicle.

BACKGROUND INFORMATION

An interface module that connects a vehicle to a computer via a radio interface via the Internet arises from U.S. patent application Ser. No. 10/573,074. The radio interface is connected within the vehicle to vehicle components and may be used to monitor vehicle components.

SUMMARY OF THE INVENTION

The interface module according to the present invention in a vehicle has the advantage over the related art that the function of a watchdog is allocated to the interface module when monitoring the components. In the process, a function signal that states that the components being monitored are functioning properly is repeatedly produced at specified time intervals and sent via the radio interface and the Internet, i.e., a communication network, in order to be collected in a computer. Such fleet management with respect to monitoring the functional capability of the individual components is possible in particular for vehicles for public short-distance passenger transportation.

It is particularly advantageous when, in order to possibly remedy the error in this manner, the processor of the interface module triggers a restart of the component concerned when a function signal cannot be produced because a component shows a faulty behavior during a test. This restart may be advantageously triggered by switching a circuit breaker that switches off and on again the energy supply to the component concerned. A relay may be used as such a circuit breaker, for example.

Furthermore, it is an advantage for the components to belong to an infotainment system positioned in a public short-distance passenger transportation vehicle. Here, the watchdog function in particular is an advantage since the persons watching the infotainment components in the vehicle cannot operate them; a preset program runs instead. As a result, a restart by a user is not possible here, so that here, the interface module according to the present invention takes remedial action.

Through the use of semiconductor memories in the interface module according to the present invention, it is possible to do without turning parts as well, such as a hard disk. This facilitates a greater degree of freedom in the assembly and in the load-carrying capacity of the interface module according to the present invention.

Finally, it is also an advantage that the components in the vehicle are connected to the interface module via a bus, for example a CAN-bus. All connected components then have a bus controller.

DETAILED DESCRIPTION

Figure 1:
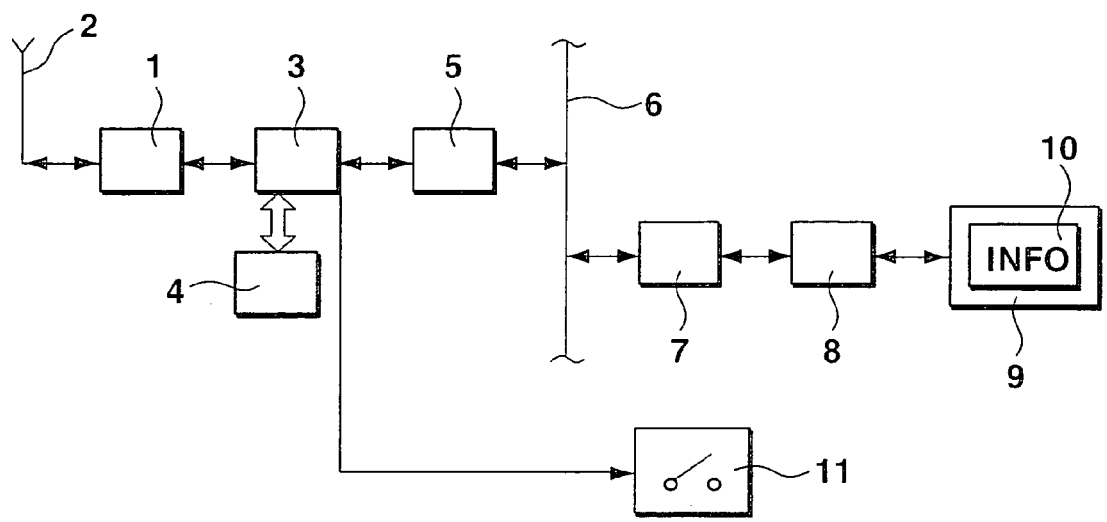
FIG. 1 shows a block diagram of the device according to the present invention in the vehicle.

Multimedia and infotainment systems for passenger entertainment and information are being installed in more and more vehicles. This applies in particular to private vehicles, airplanes, buses, and trains. In this area, relatively reasonably priced systems are also increasingly being used, whose system architectures are derived from the desktop and server field of industrial automation and telecommunication. This affects the computer architectures utilized as well as the operating systems used.

A device shall now be created according to the present invention that monitors and controls the available multimedia and infotainment systems and helps to reduce possible downtimes, and creates better diagnostic possibilities as well. In particular, critical boot, shutdown, and reset operations of the components may also be monitored and controlled in such a manner.

The interface module used for device monitoring must distinguish itself through very high reliability. On the other hand, the components to be monitored are often not available with the same reliability because of the complexity of the hardware used, the operating system and the software components. The interface module according to the present invention fulfills the following requirements:

It is space-saving and also suitable for example for C- or top-hat rail mounting in paths or as a portable service and diagnostic device with an accumulator. It is reasonably priced and quite fail-safe, and is also characterized by a more modest power consumption.

It is consequently possible to control and monitor devices, to collect diagnostic data, and to directly or automatically respond to error conditions.

The automatic monitoring of the components through a function signal in the interface module corresponds to a watchdog function. The function signal is only produced by the components and sent via an existing communication connection when all important applications are properly running. The applications run on the individual components. If the function signal does not arrive after a configurable time interval, it is the task of the interface module to trigger a restart of the component. This may be realized for example by actuating a relay via a power output.

It makes particular sense to use the monitoring functionality in buses and trains with built-in infotainment systems where the passengers do not have any direct access to a power-on, power-off or reset switch, and even the vehicle personnel cannot restart the infotainment system during the trip. Through the interface module, the monitoring may be simply connected via LAN or W-LAN or mobile radio to an Intranet or the Internet as the communication network. In a radio-based connection, travelling vehicles may also be reached problem-free in such a manner. The users, i.e., developers, field testers, service technicians, and transportation employees, may interactively access the data stored in the interface module and, depending on the configuration, request further data from the application units.

FIG. 1 shows the device according to the present invention as a block diagram. An antenna 2 is connected to an input/output of a transmitter/receiver station 1. The transmitter/receiver station 1 is connected via a data input/output to a processor 3, which is connected to a memory 4 via its second data input/output. Through a third data input/output, processor 3 is connected to a bus controller 5 and through a data output, to a circuit breaker 11. Bus controller 5 is connected to a bus 6 via its second data input/output. Here, bus 6 may be a CAN-bus. A bus controller 7 is coupled to bus 6 also via a data input/output. At the second data input/output, bus controller 7 is connected to a control 8, which in turn is connected via a data input/output to a display 9 having a display field 10.

The interface module is formed by antenna 2 of transmitter/receiver station 1, processor 3 and memory 4. Processor 3 ensures that function verifications of the components connected to bus 6, such as display 9, are performed at specified times via bus 6. The components connected to bus 6 send back their results on the function test to the interface module so that the interface module then sees whether all the components are working flawlessly. If that is the case, a function signal is produced through processor 3 and is then sent via transmitter/receiver station 1 and antenna 2. However, if an error is detected, processor 3 switches circuit breaker 11, which interrupts or closes the power supply to display 9. By switching circuit breaker 11 on or off, display 9 is restarted. A circuit breaker may be allocated here to each component or there may be circuit breakers for groups of components. Instead of a circuit breaker, a command that control 8 and display 9 must perform a restart may also be sent from processor 3 via bus 6. As a result, a restart triggered by a software command is produced.

Instead of a bus, a LAN, W-LAN, mobile radio, serial or parallel interfaces or two-wire lines for the individual components may also be used. For the radio interface, which is realized through antenna 2 and transmitter/receiver station 1, different communication possibilities are provided. A wireless LAN, W-LAN, mobile radio or radio transmission systems may be used here as well. It is also possible at certain stations to establish a contact-bound communication between the interface module and the communication network.

Figure 2:
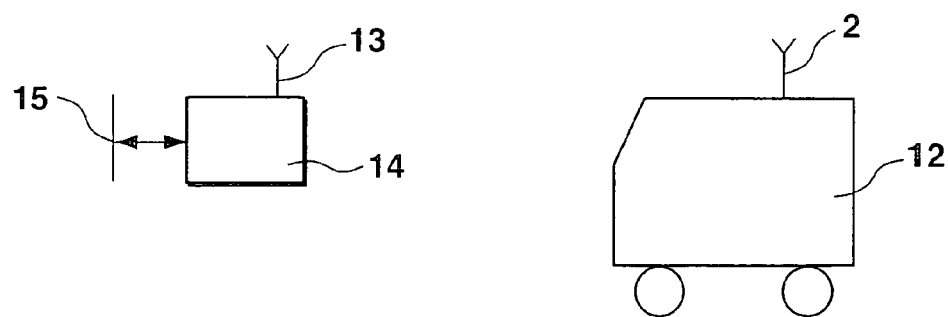
FIG. 2 shows a vehicle with the device according to the present invention, connected to a base station via radio.

FIG. 2 illustrates how a vehicle having the interface module according to the present invention and antenna 2 is connected to a base station 14 and antenna 13 via a radio channel, base station 14 then establishing the connection to Internet 15.

Figure 3:
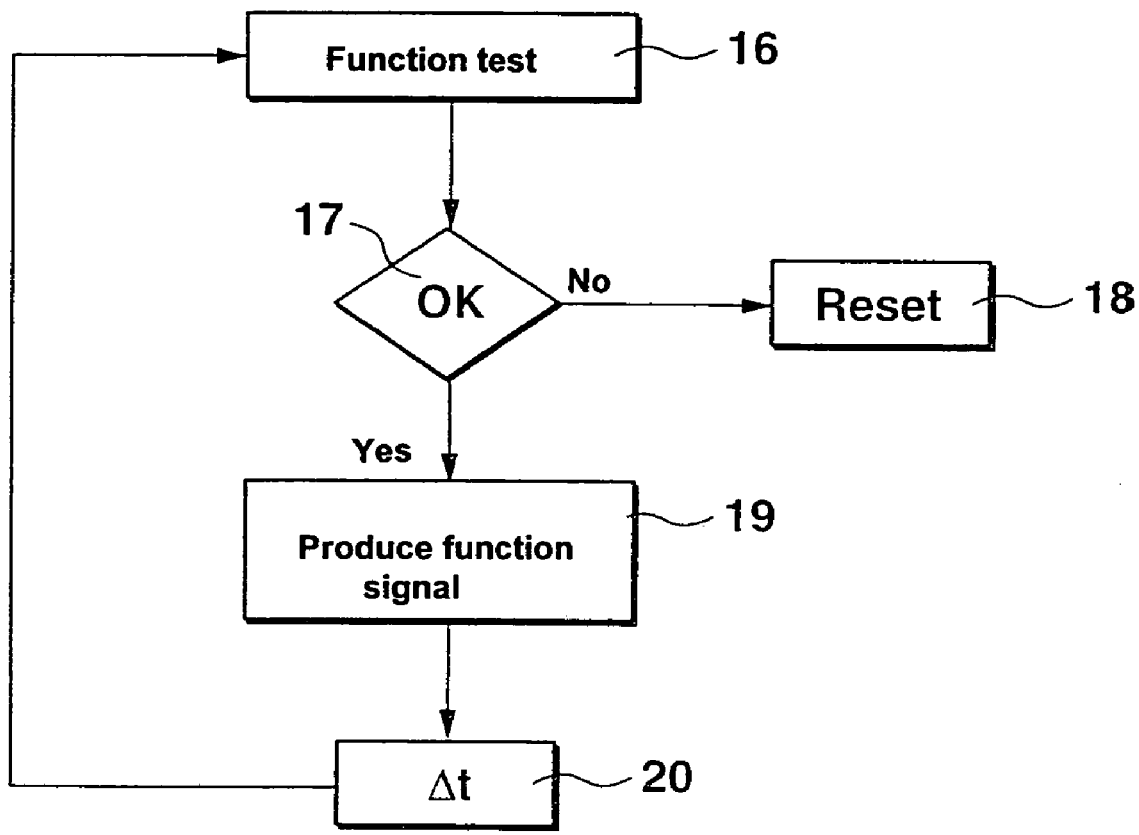
FIG. 3 shows a flow chart of the method that runs in the interface module according to the present invention.

FIG. 3 shows the sequence of operations on the interface module according to the present invention as a flow chart. In procedure step 16, the function test of the individual components, such as display 9 with its control 8, takes place through processor 3 of the interface module via bus 6. If the interface module sees that this test ran with faults, the components concerned or the component concerned are forced to restart via circuit breaker 11. This takes place in procedure step 18. Alternatively, in a faulty test, a reset signal may initially be transmitted to the components concerned in order to trigger a warm start, for example via a CAN-bus connection. If the components concerned are still not functioning correctly after the reset, a restart is forced via the circuit breaker, which is generally known as a cold start.

However, if it is detected in procedure step 17 that the function test relates that all components are functioning properly, processor 3 produces a function signal, which is transmitted via transmitter/receiver station 1 and antenna 2 to a base station 14 with its antenna 13 in order to transmit it via Internet 15 to a computer and in this way to document that the components in the vehicle 12 concerned are functioning properly. After a time $\Delta t$, as in procedure step 20, the function test is repeated here in procedure step 16.

What is claimed is:

1. An interface module for use in a vehicle and for connection to a component in the vehicle, comprising:
   a processor;
   a memory; and
   a radio interface for coupling to an external communication network, wherein:
      the processor includes an arrangement for monitoring the component for performance reliability,
      the processor generates a function signal at specified time intervals, and
      the function signal is transmitted via the radio interface provided the component is operating without fault.

2. The interface module as recited in claim 1, wherein:
   the processor triggers a restart of the component if the component does not function properly.

3. The interface module as recited in claim 2, wherein:
   the processor triggers the restart by switching a circuit breaker.

4. The interface module as recited in claim 1, wherein:
   the component belongs to an infotainment system.

5. The interface module as recited in claim 1, wherein:
   the vehicle is designed for public short distance passenger transportation.

6. The interface module as recited in claim 1, wherein:
   the memory includes a semiconductor memory.

7. The interface module as recited in claim 1, further comprising:
   a bus via which the component is connected to the interface module.

\* \* \* \* \*